Patented Mar. 11, 1952

2,588,396

UNITED STATES PATENT OFFICE 2,588,396

PYROLYSIS OF STEROID PRODUCTS

Robert H. Levin, A. Vern McIntosh, Jr., and George B. Spero, Kalamazoo, Mich., assignors to The Upjohn Company, Kalamazoo, Mich., a corporation of Michigan No Drawing. Application January 3, 1950, Serial No. 136,656

15 Claims. (Cl. 260—397.1)

The present invention relates to the pyrolysis of steroid 5,8-Diels-Alder adducts, and is more particularly concerned with a method for the pyrolysis of a steroid 5,8-maleic acid or maleic acid anhydride adduct, to introduce the conjugated diene system at carbon atoms 5,6 and 7,8 in the steroid molecule, which is conducted in the presence of an organic amine. The invention moreover relates to novel steroid compounds produced by the said pyrolytic process.

Diels-Alder adducts of 5,6:7,8 conjugated steroid dienes are well-known in the art. For example, Honigmann, Ann. 508, 89 (1934) discloses maleic acid and maleic acid anhydride adducts of dehydroergosteryl steroids, while Bergmann et al., J. Org. Chem. 13, 10 (1948), disclose similar adducts of ergosteryl and dehydroergosteryl steroids.

Still other steroid adducts of this type are disclosed in the preparations and examples given herein. Such Diels-Alder adducts result from the condensation of a dienophile, e. g., maleic acid or maleic acid anhydride, with the conjugated double bond system of the steroid nucleus involving carbon atoms 5, 6, 7, and 8. The products of such condensation may conveniently be designated "adducts"; that formed from dehydroergosteryl acetate and maleic anhydride, for example, being referred to as "the maleic anyhdride adduct of dehydroergosteryl acetate." Alternatively, the term "adduct" may be omitted and the condensation product referred to as the steroid dienophile, under which system of nomenclature the reaction product of dehydroergosteryl acetate and maleic anhydride would be designated "dehydroergosteryl acetate maleic anhydride." The adducts are also known as 5,8-endo-succinic acids and anhydrides. These systems of nomenclature are all well-established and accepted in the steroid art.

It has already been observed that Diels-Alder adducts are thermally unstable and that dissociation can be accomplished with varying facility, depending upon the nature of the adducts. The reactions between maleic anhydride and a number of polycyclic hydrocarbons containing the anthracene nucleus are truly reversible. Identical mixtures of hydrocarbon, maleic anhydride, and adduct have been obtained by heating xylene solutions of the pure adduct or equimolar amounts of its components [Organic Reactions, vol. 4, pages 9, 10, John Wiley and Sons (1948)]. The decomposition of the adducts is considered to be a pyrolysis reaction, since these adducts are decomposed by heat.

Although the known method of pyrolizing adducts by heat alone has proven fairly successful, the process can only be conducted with compounds which are stable at the high temperatures needed to eliminate the dienophilic component. At such temperatures (about 280 degrees centigrade), many steroids, especially oxygenated steroids, are unstable and tend to decompose, whereafter polymerization and other unwanted transformations usually occur. For example, Bergmann [J. Org. Chem. 13, 10 (1948)] has shown that the decomposition of steroid adducts by heat alone is of little or no practical value since, as in the case of esters, the yield of diene is rarely more than thirty percent of theory, while, in the case of carbonyl compounds, the yield becomes inconsequential.

It is of value, therefore, to be able to effect the elimination of maleic anhydride or maleic acid from such adducts, without causing unwanted transformations of the steroid molecule, by conducting the decomposition at lower temperatures. Bergmann, in the previously mentioned article, attempted to accomplish this result by upsetting the known equilibrium with the addition of a highly reactive diene which was calculated to combine with the liberated maleic anhydride, but was unsuccessful in his endeavor.

It is, therefore, an object of the present invention to provide a method whereby maleic acid or maleic anhydride adducts of $\Delta^{5,6:7,8}$ unsaturated steroids can be decomposed in a convenient manner, and at lower temperatures than previously thought possible, to produce $\Delta^{5,6:7,8}$ unsaturated steroids. It is a further object to provide a process whereby novel $\Delta^{5,6:7,8}$ unsaturated steroids can be produced in a convenient and economical manner without undesirable decomposition. An additional object is to provide a method whereby such unsaturated steroids can be produced on a large scale. Another object is to provide novel unsaturated steroids, heretofore not possible of preparation, which are useful in the synthesis of adrenal cortical hormones. Other objects of the invention will become apparent hereinafter.

It has now been found that the objects of the present invention can be accomplished, and $\Delta^{5,6:7,8}$ steroid adducts decomposed to the corresponding $\Delta^{5,6:7,8}$ unsaturated steroid, by conducting the pyrolysis in the presence of an organic amine. The method of the invention, broadly, consists in heating a steroid adduct in the presence of an organic amine at a temperature of about 100 to 225 degrees centigrade, with or without the presence of an inert organic solvent, and thereafter isolating the product. The method of the invention also has the advantage of being conveniently applicable to large scale work in that it is not necessary to remove the components from the reaction mixture to complete the reaction. It also has the further advantage that, in many instances, the desired diene can be obtained in a high degree of purity and in excellent yields. This is an exceedingly important advance in the art, inasmuch as various procedures for the production of biologically active steroid compounds, having an oxygen atom at carbon atom eleven, may proceed through certain $\Delta^{5,6;7,8}$ unsaturated steroids, and such compounds are produced with facility only from their Diels-Alder adducts.

Apparently the first step in the formation of an adduct from an unsaturated diene is the rapid formation of an ionic complex between the two components, followed by the slower and probably rate-controlling step of the formation of the adduct proper. The decomposition of the adduct would then go through the reverse process, e. g., the slow and rate-controlling formation of the ionic complex followed by its rapid decomposition into its component parts. The mechanism of the action of the amines used in the process of this invention is probably twofold. Firstly, the amine acts as a catalyst in speeding up the rate-controlling decomposition of the adduct to the ionic complex, thus permitting the decomposition reaction to be carried out at lower temperatures than when the amine is not present. Secondly, since the reaction is an equilibrium reaction, a certain amount of the dienophile is present at any particular temperature, and, if this dienophile is prevented by the amine from recombining with the diene during the reaction period, then more of the adduct is separated into its components to re-establish the equilibrium, eventually all of the material being resolved into the form of its components.

However, there is at the same time a competing reaction, which is the reaction between the amine and the adduct acid or anhydride to form an amide. The rate and temperature of decomposition of the amide adduct thus formed is not helped favorably by the excess amine present, so that the portion of the adduct which has been transformed to an amide will not decompose under the reaction conditions of this invention. That portion of the adduct which has not been converted to an amide will decompose as usual. The amount of diene formed will thus depend upon the difference between the reaction rate of amide formation and the decomposition rate of the adduct to the ionic complex.

The difference in reaction rates is the least favorable, in carrying out the method of this invention, when the amine used is a primary amine, particularly a primary aliphatic amine such as butyl amine and the like. It has also been found that a measure of correlation exists, in the case of other than primary aliphatic amines, between the ionization constants of the amines and their utility in the method of the invention. For example, dimethylaniline, dimethylbenzylamine, diethylamine, and N-ethylpyrrolidine, all of which are strong bases, have been found to be specifically preferred species of amines, while the use of N-methylmorpholine, quinoline, pyridine, collidine, and the like, which are weak bases, has resulted in somewhat diminished yields of the desired diene, and extremely weak bases such as diphenyl amine and the like are of even more limited utility.

It is, of course, to be understood that the invention is not to be limited by any theoretical consideration or explanation advanced herein, but that these are merely given in an attempt better to portray the mechanics of the process of the invention for one skilled in the art.

Amines that can be used in a preferred embodiment of the process of the invention are: secondary aliphatic amines such as dimethylamine, diethylamine, dipropylamine, dibutylamine, diamylamine, dioctylamine; tertiary aliphatic amines such as trimethylamine, triethylamine, triamylamine, methyldioctylamine, methyldiethylamine; secondary and tertiary cycloaliphatic amines such as N-methylcyclohexylamine, N,N-dimethylcyclohexylamine, N,N-diethylcyclohexylamine; secondary and tertiary heterocyclic amines such as pyrrolidine, N-methylmorpholine, N-ethylpyrrolidine, morpholine, piperidine, N-methylpiperidine, 2-methylpiperidine, 1,2 - dimethylpiperidine, 1,2,4 - trimethylpiperidine, 2,4,6-trimethylpiperidine, 1-ethyl-2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines containing only one aromatic substituent, such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as ortho-methoxy-N,N-dimethylaniline, para-ethoxy-N,N-diethylaniline, parachloro-N,N-dimethylaniline, para-bromo-N,N-diethylaniline, parafluoro - N,N-dibutylaniline, N,N - dimethylmesidine; secondary and tertiary aralkyl amines such as methylbenzylamine, dimethylbenzylamine, propylbenzylamine, diisopropylphenethylamine, diethylphenylisopropylamine; and p r i m a r y amines such as butylamine, hexylamine, octylamine, cyclohexylamine, aniline, toluidine, xylidine and the like.

Suitable starting materials for the process of the present invention are the maleic acid and maleic anhydride adducts of ergosterol, dehydroergosterol, dehydrositosterol, ergosterol acetate, ergosterol heptoate, ergosterol benzoate, ergosterol phenylacetate, ergosterol naphthoate, ergosterol furoate, dehydroergosterol aceate, dehydroergosterol propionate, dehydroergosterol benzoate, dehydroergosterol phenylacetate, dehydrositosterol acetate, dehydrositosterol heptoate, dehydrositosterol benzoate, dehydrocholesterol, dehydrocholesterol acetate, dehydrocholesterol benzoate, methyl 3-acetoxy-bisnor-5,7,9(11)-cholatrienate, methyl 3-acetoxy-bisnor-5,7-choladienate, methyl 3-butyroyloxybisnor-5,7,9(11)-cholatrienate, methyl 3-butyroyloxybisnor-5,7-choladienate, butyl 3-benzoyloxybisnor-5,7,9(11)-cholatrienate, octyl 3-phenylacetoxybisnor-5,7,9(11)-cholatrienate, 3-acetoxy-5,7,9(11)-pregnatrien-20-one, 3-butyroyloxy-5,7,9(11)-pregnatrien-20-one, 3-benzoyloxy-5,7,9(11)-pregnatrien-20-one, 3-acetoxy-5,7-pregnadien-20-one, 3-benzoyloxy-5,7-pregnadien-20-one, 3,21-diacetoxy-5,7,9(11)-pregnatrien-20-one, 3-butyroxyloxy-21-acetoxy-5,7,9(11)-pregnatrien-20-one, 3 - heptanoyloxy-21-acetoxy-5,7,9(11)-pregnatrien-20-one, 3-benzoyloxy-21-acetoxy-5,7,9(11) - pregnatrien - 20-one, 3,11-dihydroxy-5,7-pregnadien-20-one, 3-acetoxy-11-hydroxy-5,7-pregnadien-20 - one, 3-benzoyloxy-11-hydroxy-5,7-pregnadien - 20 - one, 3,11,21-trihydroxy-5,7-pregnadien-20 - one, 3,21-diacetoxy-11-hydroxy-5,7-pregnatrien-20-one, 3-benzoyloxy-11-hydroxy-21-acetoxy - 5,7-pregnadien-20-one, 3,11,17,21-tetrahydroxy-5,7-pregnadien-20-one, 3,17,21-triacetoxy-11-hydroxy - 5,7-pregnadien-20-one, 3-benzoyloxy - 17,21 - diacetoxy-11-hydroxy-5,7-pregnadien-20-one, 3 - acetoxy-5,7-pregnadien-11,20-dione, 3,21 - diacetoxy-5,7-pregnadien-11,20-dione, 21-dione, 21-acetoxy-5,7-pregnadien-3,11,20-trione, 17,21 - diacetoxy-5,7-pregnadien-3,11,20-trione, and the like.

The temperature at which the process of the invention is conducted is between about 100 and 225 degrees centigrade, preferably between 150 and 200 degrees centigrade. It should, of course, be obvious that the more stable steroid adducts containing a hydrocarbon side-chain attached to carbon atoms seventeen can be more satisfactorily decomposed at the higher temperatures of the range than can the more sensitive oxygenated degradation products.

The process of the present invention, then, comprises heating a selected steroid adduct to a temperature between about 100 and 225 degrees centigrade, preferably between about 150 and 200 degrees centigrade, in the presence of an organic amine, removing excess amine, and recovering the product, wherein the maleic acid or maleic anhydride adduct has been eliminated from the molecule, with restoration of the conjugated double bond system at carbon atoms 5,6:7,8. In certain instances, such as in the case of the removal of the maleic acid or maleic anhydride adduct from a compound such as an adduct of 5,7,9(11)-pregnatrien-3,20-dione, the double band system at carbon atoms 5,6:7,8 has but a temporary existence, the double bond in the 5,6 position immediately aligning into conjugation with the 3-keto group, to produce a 4,5:7,8 double bond system in the steroid nucleus. The time required for the reaction is usually from about one to eight hours, depending upon variable factors such as the steroid adduct treated, the amine employed, and the temperature of reaction. Ordinarily, a reaction period of about four hours is entirely satisfactory, although, at the lower temperatures, a more extended period may be employed to advantage. The employment of pressure may in some cases be advantageous, although it is in most cases preferred to conduct the pyrolysis reaction at atmospheric pressure.

The type of amine which is suitable for employment in the process of the present invention has already been indicated in the foregoing, but may be accurately defined as an amine selected from the group consisting of (a) secondary and tertiary aliphatic amines, preferably those containing up to and including 18 carbon atoms; (b) secondary and tertiary cycloaliphatic amines, preferably those containing up to and including 18 carbon atoms; (c) secondary and tertiary heterocyclic amines, preferably those containing up to and including ten carbon atoms; (d) aromatic heterocyclic amines, preferably those containing up to and including ten carbon atoms; (e) secondary and tertiary carbocyclic aromatic amines containing no more than one aromatic substituent directly attached to nitrogen, and preferably such amines containing up to and including twenty carbon atoms, including hydroxy-substituted aliphatic amines and halo- and alkoxy-substituted aromatic amines; (f) secondary and tertiary aralkyl amines, and preferably such amines containing up to and including 21 carbon atoms in the molecule, and the like.

Some of the compounds which may be employed in the preparation of products of this invention and methods for their preparation are described in copending applications Serial No. 63,613, filed December 4, 1948, now Patent No. 2,575,350; Serial No. 121,224, filed October 13, 1949; Serial No. 111,100, filed August 18, 1949; and Serial No. 119,767, filed October 5, 1949.

As disclosed in copending application Serial No. 63,613, a maleic anhydride adduct of an ester of a 3-acyloxybisnor-5,7,9(11)-cholatrienic acid can be prepared by the esterification of the acid. Among the esters of the carboxylic acid so contemplated are the methyl, ethyl, isopropyl, sec.-butyl, hexyl, cyclohexyl, benzyl, phenyl, and lauryl esters, and the like. The 3-acyloxybisnor-5,7,9(11)-cholatrienic acid can be prepared by the ozonization of the maleic anhydride adduct of an ester of dehydroergosterol dissolved in a suitable solvent, such as methylene dichloride, at a temperature between minus 80 and plus 20 degrees centigrade using about 1.25 to 2.5 moles of ozone per mole of adduct. Glacial acetic acid is then added to the ozonide solution, the reaction mixture fractionally distilled to remove the ozonization solvent, if other than glacial acetic acid, and the ozonide decomposed in known manner under oxidizing conditions, hydrogen peroxide, silver nitrate or chromic acid being suitable oxidizing agents, and isolating the acid thus obtained. The acid can then be esterified by known procedure to give the desired esters.

Other of the adducts used as starting materials to produce the products of the present invention can be prepared by the selective oxidation of an enol ester of an adduct of a 3-acyloxybisnor-5,7,9(11)-cholatrien-22-al, represented by the formula:

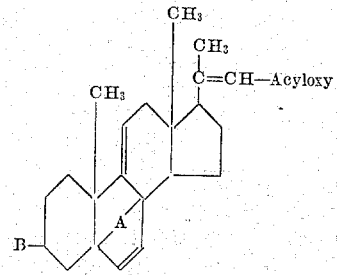

wherein A is an adduct radical derived from the group consisting of maleic acid and maleic anhydride and B is an acyloxy group derived from an organic carboxylic acid containing from one to ten carbon atoms, the said enol esters being prepared by the reaction of an acid anhydride or an acid halide in the presence of an alkaline salt of the acid with the corresponding aldehyde.

The starting adducts of 3-acyloxybisnor-5,7,9(11)-cholatrien-22-als can be prepared from adducts of 3-esters of dehydroergosterol by selective oxidation as described and claimed in the copending application Serial 111,100, filed August 18, 1949, on behalf of Robert H. Levin; and as more fully described hereinafter.

The 3-esters of dehydroergosterol, from which the 3 - acyloxybisnor - 5,7,9(11)-cholatrien-22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxyl group of the dehydroergosterol acylated by known procedure. Alternatively, the 3-hydroxyl group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters, if desired.

The ester group, when present in the 3-position of the dehydroergosterol, is for the purpose of protecting the 3-hydroxy group in subsequent chemical reactions. For this purpose any convenient ester of an organic carboxylic acid, which is non-reactive under the conditions of the reactions, is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cylopentanoic and cyclohexanoic; and aromatic acids such as benzoic, toluic, naphthoic, and the like. The acids may also contain substituents such as halogen, alkyl, alkoxy, and the like, and these substituents will be carried throughout the synthesis and appear in the final cholatetraene product. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent, such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to between about minus 80 and plus 30 degrees centigrade, and passing ozone into the solution until about 1.0 to 1.25 moles of ozone per mole of adduct have been absorbed. The temperature of the solution should be maintained below about 30 degrees centigrade, preferably between a temperature of minus 30 and minus 70 degrees centigrade, during the addition of the ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations, such as chloroform, acetic acid, carbon tetrachloride, ethylene chloride, methylene chloride, and the like can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide must be prevented from forming hydrogen peroxide by combining with any moisture present, and that molecular oxygen must be prevented from oxidizing the aldehyde thus formed. This can be conveniently accomplished by decomposing the ozonide with finely-powdered zinc in glacial acetic acid.

As is conventional with ozonizations when conducted in solvents other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 22-acyloxybisnor-5,7,9(11),20(22)-cholatetraenes [22-enol esters of adducts of 3-acyloxybisnor-5,7,9(11)-cholatrien-22-als] can be conveniently prepared by heating the corresponding 3-hydroxy or acyloxy aldehyde maleic acid anhydride, or maleic acid mono- or di-ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, naphthoic acid anhydride, and the like, are also operative. The acid anhydrides can also be substituted by non-reactive groups, such as halo, alkyl, and alkoxy, as in the case of chloroacetic, ortho-toluic, or methoxybenzoic acid anhydrides. The reaction can be conveniently followed by observing the color change in the reaction mixture, optimum yields being obtained by discontinuing the application of heat when the color of the solution changes from yellow to brown.

Ordinarily the reaction mixture is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as 100–150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure and separating the ester from alkali metal salts, which procedure gives a product sufficiently pure for most purposes, but which can be further purified by recrystallization from acetone-water, acetone-pentane, or like pairs of solvents, if desired. Single solvents may be used as well as pairs.

The ozonization of the thus-prepared enol ester involves dissolving the enol ester in a suitable solvent, cooling to between about minus eighty degrees and plus thirty degrees centigrade, and passing ozone or ozonized oxygen into the solution until about 1.0 to about 1.25 moles, preferably 1.0 to 1.1 moles, of ozone per mole of adduct have been absorbed. The addition of ozone to the 20:22 double bond is so rapid that only a small amount of ozone escapes from the reaction mixture, and the amount of ozone ordinarily required therefore closely approximates the theoretical amount. Any loss to the solvent must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like can be used for the ozonization reaction.

The 20:22 ozonides thus produced are then decomposed under reductive conditions, that is, in the absence of oxidizing agents, whether added or formed in the course of the reaction by products of decomposition of the ozonide. This means that the excess oxygen formed by decomposition of the ozonide must be prevented from forming hydrogen peroxide by combining with any moisture present, and that molecular oxygen must be prevented from oxidizing the product thus formed. This can be conveniently accomplished by decomposing the ozonide in glacial acetic acid by the addition of finely-powdered zinc, with the addition of a catalytic amount of a colloidal metal such as silver, platinum, or palladium, in which latter case a hydrogen atmosphere is also employed. The use of "reductive conditions" for the decomposition of ozonides is well established in the art [Hill and Kelly, "Organic Chemistry," p. 53, The Blakiston Company, Philadelphia (1934); Gilman, "Organic Chemistry," 2nd ed., p. 636, John Wiley and Sons, New York (1943); Church et al., J. Am. Chem. Soc. 56, 176–184 (1934); Long, Chem. Reviews 27, 452–454 (1940)].

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:22 ozonide and removal of the metal, the ketone can be recovered by diluting the acetic acid with water, or by other conventional procedure for the recovery of ketones, such as by formation of a carbonyl derivative, e. g., the 2,4-dinitrophenylhydrazone. Recrystallization from acetone or the like results in a more highly purified ketone product.

The 3 - acyloxy - 5,7,9(11)-pregnatrien-20-one adducts thus obtained can be converted to their 21-acetoxy derivatives by reaction of the selected 3-acyloxy-5,7,9(11)-pregnatrien-20-one or 3-hydroxy-5,7,9(11)-pregnatrien-20-one maleic acid, maleic anhydride, or maleic acid diester adduct with lead tetraacetate. The lead tetraacetate is ordinarily employed in an amount in excess of the theoretical, and an organic solvent for the reaction is employed, for example acetic acid and water, benzene, or ether, with acetic acid being preferred. The reaction may conveniently be carried out at a temperature between about twenty and 100 degrees centigrade, with temperatures of about 50–60 degrees centigrade, which are readily obtainable by employment of a water-bath, being preferred. The lead tetraacetate usually goes into solution quite readily, and the reaction is complete in from 24 to 96 hours. The 21-acetoxy adduct may then be recovered by evaporating the solution under a vacuum, dissolving the residue in ether, washing with water, drying, and recrystallizing from a solvent, such as alcohol, if desired, or in other conventional manner.

The 3 - acyloxy - 5,7,9(11)-pregnatrien-20-one adducts are also readily convertible to adducts of 3,20-diacyloxy-5,7,9(11),17(20) - pregnatetraenes of the formula:

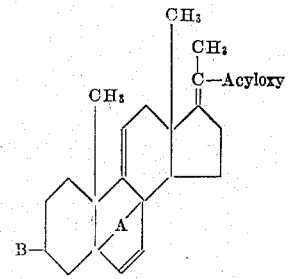

wherein B and A have the values already given and "Acyloxy" has the same value as B. These compounds are conveniently prepared by heating the corresponding 3-hydroxy or 3-acyloxy 20-ketone maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, naphthoic acid anhydride, and the like, are also operative. The acid anhydrides can also be substituted by non-reactive groups such as halo, alkyl, and alkoxy, as in the case of chloroacetic, ortho-toluic, or methoxybenzoic acid anhydrides. Ordinarily the reaction is heated at about 140 degrees centigrade for from about four to six hours, but temperatures as low as 100 and as high as 180 degrees centigrade are also operative. The reaction is usually conducted at the boiling point of the anhydride but in the case of the higher-boiling anhydrides, such as benzoic anhydride, a suitable temperature control, preferably between about 100 and 150 degrees centigrade, should be used, since the adduct otherwise tends to decompose in the higher temperature range. If a 3-hydroxy 20-keto adduct is thus reacted with an anhydride, the hydroxyl group is usually acylated, and, similarly, if a maleic acid adduct is used instead of a diester or an anhydride, the anhydride will be formed. The enol ester can be isolated by removing the excess anhydride under reduced pressure and separating the ester from alkali metal salts, which procedure gives a product sufficiently pure for most purposes, but which can be further purified by recrystallization from acetone-water, acetone-pentane, or like pairs of solvents, if desired.

A more detailed preparation of the preliminary materials used to prepare the products of this invention is as follows:

PREPARATION 1.—MALEIC ANHYDRIDE ADDUCT OF 3(BETA)-ACETOXY - BISNOR - 5,7,9 - CHOLATRIENIC ACID

A solution of 30.0 grams (0.056 mole) of the 5,8-maleic anhydride adduct of dehydroergosteryl acetate in 600 milliliters of methylene chloride was cooled to minus 78 degrees centigrade and maintained at that temperature while 3.544 grams of ozone (1.3 moles per mole of adduct) was passed through over a period of three hours. The reaction mixture was diluted with 500 milliliters of glacial acetic acid and the methylene chloride was fractionally distilled in vacuo. An additional 200 milliliters of acetic acid was added, the solution cooled to 15 degrees centigrade and the ozonide decomposed by adding 44 grams of zinc dust, in portions, with mechanical stirring. The temperature was kept between 15 and 20 degrees centigrade. This addition required thirty minutes. One milliliter of one percent silver nitrate solution was added, and stirring was continued for twenty minutes until a test for peroxide with starch-iodide paper was negative. The zinc was separated by filtration and washed with acetic acid.

The combined acetic acid solution was then cooled to 18 degrees centigrade and stirred mechanically while being treated with a solution of chromic acid (11.2 grams in ten milliliters of water and thirty milliliters of acetic acid) for a period of three and one-half hours. The excess chromic acid was destroyed by the addition of 15 milliliters of methanol and two grams of sodium bisulfite, and the reaction mixture was poured into two liters of water. The product, which precipitated, was separated by filtration and washed with water. The yield was 22.1 grams (82 percent of the theoretical) of the 5,8-maleic anhydride adduct of 3(beta)-acetoxy-bisnor-5,7,9-cholatrienic acid, melting at 226-227 degrees centigrade. Recrystallization from methanol and from ether-hexane gave 11.1 grams (55 percent of purified product), melting point 239.5-243 degrees centigrade. Its percentage analysis was as follows:

Calculated for $C_{28}H_{34}O_7$: C, 69.69  H, 7.10
Found:   69.73   7.17

PREPARATION 2.—MALEIC ANHYDRIDE ADDUCT OF 3-HEPTANOYLOXY - BISNOR - 5,7,9 - CHOLATRIENIC ACID

Nine hundred milligrams of the maleic anhydride adduct of 3(beta)-acetoxy-bisnor-5,7,9-cholatrienic acid was dissolved in a minimum of methanol. A twenty percent excess of potassium hydroxide dissolved in five milliliters of methanol was added and the reaction mixture heated on the steam bath for one hour. After cooling to room temperature, ten percent hydrochloric acid was added dropwise to the methanolic solution until it became just acid to litmus. The acidic solution was then diluted with 25 milliliters of saturated sodium chloride solution and the resulting heavy white precipitate extracted with five separate 25-milliliter portions of ether. The combined ether extracts were washed free from acid with saturated sodium chloride solution, dried over anhydrous sodium sulfate, filtered and concentrated to 75 milliliters. Upon cooling the solution, shiny crystals of the maleic acid adduct of 3(beta)-hydroxy-bisnor-5,7,9-cholatrienic acid formed, which, when recovered by filtration and dried, melted at 221–225 degrees centigrade. Total yield of product was 77.5 percent.

The resulting 3-hydroxy-bisnor-5,7,9-cholatrienic acid-maleic acid adduct was dissolved in 30 milliliters of warm heptylic anhydride (heptanoic or oenanthylic anhydride) and 12 milliliters of pyridine. The deaction mixture was then heated under reflux for ten minutes, the temperature of the mixture rising to 130 degrees centigrade. The heat was removed and the reaction mixture allowed to stand for an additional one and one-quarter hours. After the excess anhydride and pyridine had been removed by distillation under reduced pressure, the residue was poured into ice water. The aqueous suspension was extracted with ether, the ether removed and the residue crystallized from cyclohexane. There was obtained 0.42 gram of the maleic anhydride adduct of 3-heptanoyloxy-bisnor-5,7,9-cholatrienic acid melting at 209-211 degrees centigrade. Its percentage analysis was as follows:

Calculated: C, 71.71  H, 8.02
Found:   71.41   8.07

PREPARATION 3.—MALEIC ANHYDRIDE ADDUCT OF METHYL 3(BETA)-ACETOXY - BISNOR-5,7,9-CHOLATRIENATE

An excess of diazomethane dissolved in methlene dichloride was added to a suspension of one gram of the maleic anhydride adduct of 3 (beta) acetoxybisnor-5,7,9-cholatrienic acid (prepared as described in Preparation 1) in ten milliliters of ether under room conditions and allowed to stand for fifteen minutes. After removal of the excess diazomethane by distillation, the residual ether solution was filtered and cooled. There was thus obtained 0.82 gram of the methyl ester of the maleic anhydride adduct of 3 (beta)-acetoxy-bisnor-5,7,9-cholatrienic acid, melting at 242–244.5 degrees centigrade. Crystallization from a mixture of methylene dichloride and ether raised the melting point to 245–247.5 degrees centigrade. The product had the following percentage analysis:

Calculated for $C_{29}H_{36}O_7$: C, 70.14  H, 7.31
Found:   69.98   7.48

PREPARATION 4.—MALEIC ACID ADDUCT OF DEHYDROERGOSTEROL

Twelve grams of maleic anhydride adduct of dehydroergosteryl acetate was dispersed in 300 milliliters of methyl alcohol, whereafter a solution of 2.6 grams of potassium hydroxide in 300 milliliters of water was added to the suspension and the reaction mixture heated under reflux for 135 minutes, 200 milliliters of water being added portionwise during the reaction period. The hot solution was filtered to remove any undissolved solid, cooled, and acidified. After washing the preciptate with water and drying, there was obtained 9.2 grams of the maleic acid adduct of dehydroergosterol, melting at 190–192 degrees centigrade.

PREPARATION 5.—MALEIC ANHYDRIDE ADDUCT OF 3-HEPTANOYLOXY-DEHYDROERGOSTEROL

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186–191.5 degrees centigrade.

In a similar manner using the appropriate acid anhydride the 3-propionyl, 3-butyryl, 3-benzoyl, 3-isopropionyl and like esters of the maleic anhydride adduct of dehydroergosterol can be obtained.

PREPARATION 6.—MALEIC ANHYDRIDE ADDUCT OF 3(BETA)-ACETOXY-BISNOR-5,7,9(11)-CHOLATRIEN-22-AL

A solution of 5.35 grams of the maleic anhydride adduct of 3(beta)-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3(beta)-acetoxybisnor-5,7,9(11)-cholatrien-22-al, a fine white powder melting at 187–197 degrees centigrade.

To a solution of 0.30 gram of the maleic anhydride adduct of 3(beta)-acetoxybisnor-5,7,9(11)-cholatrien-22-al in thirty milliliters of ethanol was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3(beta)-acetoxybisnor-5,7,9(11)-cholatrien-22-al, melting at 269–271 degrees centigrade.

PREPARATION 7

In a manner essentially that described in Preparation 6, the following compounds were prepared.

1. Maleic anhydride adduct of 3(beta)-formoxybisnor-5,7,9(11)-cholatrien-22-al, melting at 95–130 degrees centigrade. 2,4-Dinitrophenylhydrazone, melting at 165–168 degrees centigrade.

2. Maleic anhydride adduct of 3(beta)-heptanoyloxy-bisnor-5,7,9(11)-cholatrien-22-al, melting at 197.5–199 degrees centigrade. 2,4-Dinitrophenylhydrazone, melting at 253–257 degrees centigrade.

PREPARATION 8.—MALEIC ANHYDRIDE ADDUCT OF 3(BETA)-ACETOXY-22-ACETOXY-BISNOR-5,7,9-(11),20(22)-CHOLATETRAENE

A mixture of twenty grams of the maleic anhydride adduct of 3(beta)-acetoxybisnor-5,7,9(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3(beta)-acetoxy-22-acetoxy-bisnor-5,7,9(11),20(22)-cholatetraene, which melted at 186 to 193 degrees centigrade. Recrystallization of the crude product from a mixture of acetone and pentane raised the melting point to 200.5 to 202 degrees centigrade.

In the same manner as given above, 22-acyloxy, e. g., formoxy, acetoxy, propionoxy, butyroxy, valeroxy, hexanoyloxy, heptanoyloxy, octanoyloxy, benzoyloxy, naphthoylxy, and like 3-acyloxy-bisnor-5,7,9(11),20(22)-cholatetraene adducts, are obtained from the compounds of Preparations 6 and 7. Such representative compounds include 3-formoxy-22-acetoxy-bisnor-5,7,9(11),20(22)-cholatetraene, 3-propionoxy-22-acetoxybisnor-5,7,9(11),20(22)-cholatetraene, 3,22-di-propionoxybisnor-5,7,9(11),-20(22)-cholatetraene, 3,22-di-benzoyloxybisnor-5,7,9(11),20(22)-cholatetraene, and heptanoyloxy-22-octanoyloxy-bisnor-5,7,9(11),20(22)-cholatetraene adducts with maleic anhydride or maleic acid.

PREPARATION 9.—MALEIC ANHYDRIDE ADDUCT OF 3(BETA)-ACETOXY-5,7,9(11)-PREGNATRIEN-20-ONE

A solution of 5.08 grams of the maleic anhydride adduct of 3(beta)-acetoxybisnor-5,7,9(11)-cholatrien-22-alkenol acetate (from Preparation 8) in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of maleic anhydride adduct of 3(beta)-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

PREPARATION 10.—MALEIC ACID ADDUCT OF 3(BETA)-HYDROXY-5,7,9(11)-PREGNATRIEN-20-ONE

A solution of one gram of sodium hydroxide in five milliliters of water was added with stirring to a suspension of one gram of the maleic anhydride adduct of 3(beta)-acetoxy-5,7,9(11)- pregnatrien-20-one in methanol at room temperature, a turbid solution forming almost immediately. After standing for thirty minutes the addition of thirty milliliters of water resulted in a clear solution. This was allowed to stand for six hours, then made acid by addition of three normal hydrochloric acid and diluted with water to 100 milliliters. The weakly turbid mixture was placed in the refrigerator, whereafter 0.61 grams of the maleic acid adduct of 3(beta)-hydroxy-5,7,9(11)-pregnatrien-20-one, melting at 140–143 degrees centigrade, precipitated therefrom. After several crystallizations from an acetone-water mixture, the adduct melted at 211–215 degrees centigrade.

PREPARATION 11.—MALEIC ANHYDRIDE ADDUCT OF 3(BETA)-HYDROXY-5,7,9(11)-PREGNATRIEN-20-ONE

Similarly, the maleic anhydride adduct of 3-(beta)-hydroxy-5,7,9(11)-pregnatrien-20-one, melting point about 195 degrees centigrade, was prepared by refluxing the maleic acid adduct of 3(beta)-hydroxy-5,7,9(11)-pregnatrien-20-one with Dowtherm for eight hours. The 3-hydroxy-maleic anhydride adduct is also obtained by heating the 3-hydroxy maleic acid adduct to just above its melting point, which procedure causes water to be evolved, with the closing of the anhydride ring.

PREPARATION 12.—MALEIC ANHYDRIDE ADDUCT OF 3(BETA)-HEPTANOYLOXY-5,7,9(11)-PREGNATRIEN-20-ONE

The maleic anhydride adduct of 3(beta)-heptanoyloxy-5,7,9(11)-pregnatrien-20-one, melting point 170–171 degrees centigrade, was prepared by refluxing the maleic acid adduct of 3(beta)-hydroxy-5,7,9(11)-pregnatrien-20-one with heptylic anhydride and pyridine for a period of twenty hours, and working up the reaction product in the usual manner.

In a like manner the 3-propionoxy, 3-butyroxy and 3-benzoyloxy and similar esters of 3-hydroxy-5,7,9(11)-pregnatrien-20-one can be prepared.

The above 3-hydroxy and 3-acyloxy-5,7,9(11)-pregnatrien-20-one adducts can be converted to 21-acetoxy derivatives having the formula:

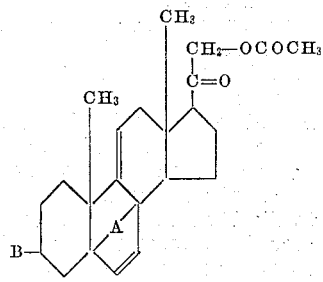

wherein A is an adduct radical derived from maleic anhydride and B is a member of the group consisting of hydroxy and an acyloxy group derived from an organic carboxylic acid containing from one to ten carbon atoms, inclusive. The 21-acetoxy compounds are conveniently prepared by reaction of the selected 3-acyloxy-5,7,9-(11)-pregnatrien-20-one or 3-hydroxy-5,7,9(11)-pregnatrien-20-one maleic acid, maleic anhydride, or maleic acid diester adduct with lead tetraacetate. The lead tetraacetate is ordinarily employed in an amount in excess of the theoretical, and an organic solvent for the reaction is employed, for example acetic acid and water, benzene, or ether, with acetic acid being preferred. The reaction may conveniently be carried out at a temperature between about twenty and 100 degrees centigrade, with temperatures of about 50–60 degrees centigrade, which are readily obtainable by employment of a water-bath, being preferred. The lead tetraacetate usually goes into solution quite readily, and the reaction is complete in from 24 to 96 hours. The 21-acetoxy adduct may then be recovered by evaporating the solution under a vacuum, dissolving the residue in ether, washing with water, drying, and recrystalizing from a solvent, such as alcohol, if desired, or in other conventional manner.

PREPARATION 13.—MALEIC ANHYDRIDE ADDUCT OF 3(BETA),21-DIACETOXY-5,7,9(11)-PREGNATRIEN-20-ONE

The maleic anhydride adduct of 3(beta)-acetoxy-5,7,9(11)-pregnatrien-20-one (0.45 gram, .001 mole) and 1.33 grams of lead tetraacetate were added to 35 milliliters of 98.3 percent acetic acid which had been distilled over chromium trioxide. The mixture was heated in a water bath maintained at about 56 degrees centigrade and allowed to stand at that temperature for seventy-two hours. The lead tetraacetate dissolved slowly during the first hour and went into solution. The solution was then evaporated in vacuo until only a few milliliters of solvent remained, the residue was dissolved in ether, washed with water, dried, and the ether removed. Crystallization of the residue from alcohol gave 0.17 gram of maleic anhydride adduct of 3(beta),21-diacetoxy-5,7,9-(11)-pregnatrien-20-one melting at 225 to 235 degrees centigrade. After several recrystallizations from methanol, the material melted at 240–243 degrees centigrade.

Analysis:
Calculated for $C_{29}H_{34}O_8$: C, 68.22  H, 6.71
Found: 68.28  6.75
68.15  6.75

In the same manner as given above, other 3-acyloxy-21-acetoxy-5,7,9(11)-pregnatrien-20-one maleic anhydride adducts, including 3-benzoyloxy-21-acetoxy-5,7,9(11)-pregnatrien-20-one maleic anhydride and 3-heptanoyloxy-21-acetoxy-5,7,9(11)-pregnatrien-20-one maleic anhydride adducts, can be prepared.

The 3-hydroxy- or 3-acyloxy-5,7,9(11)-pregnatrien-20-one adducts, moreover, are readily convertible to adducts of 3,20-diacyloxy-5,7,9(11),-17(20)-pregnatetraenes of the formula:

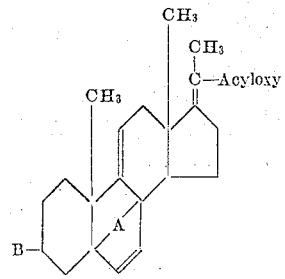

wherein A is an adduct radical derived from a dienophile selected from the group consisting of maleic acid anhydride and maleic acid diesters, and wherein B is an acyloxy group, said specific acyloxy groups representative of B and said specific maleic acid diesters being the same as those described hereinbefore for the compounds of the present invention, and wherein "Acyloxy" has the same value as B. These compounds are conveniently prepared by heating the corresponding 3-hydroxy or 3-acyloxy 20-ketone maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, naphthoic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, preferably between about 100 and 150 degrees centigrade, should be used, since the adduct otherwise tends to decompose in the higher temperature range. If a 3-hydroxy 20-keto adduct is thus reacted with an anhydride, the hydroxy group is usually acylated, and, similarly, if a maleic acid adduct is used instead of a diester or an anhydride, the anhydride will be formed. The enol ester can be isolated by removing the excess anhydride under reduced pressure and separating the ester from alkali metal salts, which procedure gives a product sufficiently pure for most purposes, but which can be further purified by recrystallization from acetone-water, acetone-pentane, or like pairs of solvents, if desired.

PREPARATION 14.—MALEIC ANHYDRIDE ADDUCT OF 3(BETA),-20 - DIACETOXY- 5,7,9(11),17(20) - PREGNATETRAENE

A solution of 2.25 grams (.005 mole) of the maleic anhydride adduct of 3(beta)-acetoxy-5,7,9(11)-pregnatrien-20-one and 0.95 gram of p-toluenesulfonic acid in 150 milliliters of acetic anhydride was distilled slowly for four hours, at the end of which period the twenty milliliters of acetic anhydride which remained was removed in vacuo. The residue was dissolved in ether, washed with five percent sodium bicarbonate and water, dried, and evaporated to dryness. The crude dark product was treated with Darco activated carbon and crystallized from alcohol to give 0.6 gram of crystalline maleic anhydride adduct of 3(beta),20-diacetoxy-5,7,9(11),17(20)-pregnatetraene, melting at 196 to 217 degrees centigrade. After several recrystallizations from methanol, it melted at 217.5–219 degrees centigrade.

Analysis:
Calculated for $C_{29}H_{34}O_7$: C, 70.42  H, 6.93
Found: 70.54  7.05
70.40  6.71

In the same manner as given above other 3,20-diacyloxypregnatetraene adducts can be prepared, including 3,20-dipropionoxy-5,7,9(11),17(20)-pregnatetraene maleic anhydride adduct, 3-benzoyloxy-20-acetoxy-5,7,9(11),17(20)-pregnatetraene maleic anhydride adduct, 3-butyroxy-20-acetoxy-5,7,9(11),17(20)-pregnatetraene maleic anhydride adduct, 3-heptanoyloxy-20-acetoxy-5,7,9(11),17(20)-pregnatetraene maleic anhydride adduct, and the like.

The following examples are illustrative only and are not to be construed as limiting.

Example 1.—Decomposition of the maleic anhydride adduct of dehydroergosteryl acetate (a) DIETHYLAMINOETHANOL A solution of five grams of the maleic anhydride adduct of dehydroergosteryl acetate in twenty milliliters of beta-diethylaminoethanol was heated under reflux for three hours, the excess amine removed under reduced pressure, and the residue crystallized from methanol. There was thus obtained 0.26 gram of dehydroergosteryl acetate, which melted at 142 to 145 degrees centigrade, and 4.5 grams of recovered starting material.

(b) DIMETHYLANILINE

A solution of five grams of the maleic anhydride adduct of dehydroergosteryl acetate in 25 milliliters of dimethylaniline was heated under reflux for three hours and then the excess amine removed by distillation under reduced pressure. The residue was dissolved in 300 milliliters of ether, washed with 300 milliliter portions of cold one percent sulfuric acid, cold five percent sodium carbonate solution, water, and dried. Upon removal of the solvent by distillation and crystallization of the residue from methanol, there was thus obtained 2.96 grams of dehydroergosteryl acetate, which melted at 130 to 144 degrees centigrade.

(c) DIETHYLAMINE

A mixture of one gram of the maleic anhydride adduct of dehydroergosteryl acetate, five milliliters of diethylamine, and twenty milliliters of Dowtherm was heated in an autoclave for four hours at 175 degrees centigrade, cooled, diluted with 100 milliliters of ether, washed with an equal volume of water, and dried. Upon removal of the solvent by distillation and crystallization of the residue from methanol, there was obtained 0.29 gram of dehydroergosteryl acetate, which melted at 137 to 147 degrees centigrade. Chromatographic purification of the mother liquors gave an additional 0.34 gram of dehydroergosteryl acetate, melting at 145 to 147 degrees centigrade.

(d) N,N-DIMETHYLBENZYLAMINE

A solution of one gram of the maleic anhydride adduct of dehydroergosteryl acetate in ten milliliters of N,N-dimethylbenzylamine was heated under reflux for four hours and the excess amine removed under reduced pressure. Upon crystallization of the residue from methanol, there was obtained 0.79 gram of dehydroergosteryl acetate, which melted at 142 to 144 degrees, thus making the conversion quantitative.

(e) ANILINE

A solution of one gram of the maleic anhydride adduct of dehydroergosteryl acetate in twenty milliliters of aniline was heated under reflux for four and one-half hours, and the excess amine removed by distillation under reduced pressure. The residue was dissolved in fifty milliliters of benzene and chromatographed over alumina. Upon evaporation of the solvent there was obtained 0.21 grams of dehydroergosteryl acetate, which melted at 142 to 145 degrees centigrade.

(f) MORPHOLINE

A solution of one gram of the maleic anhydride adduct of dehydroergosteryl acetate in ten milliliters of morpholine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.086 gram of dehydroergosteryl acetate, which melted at 145 to 147 degrees centigrade.

(g) N-ETHYLPYRROLIDINE

A solution of one gram of the maleic anhydride adduct of dehydroergosteryl acetate in ten milliliters of N-ethylpyrrolidine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation, the residue dissolved in 100 milliliters of benzene and chromatographed over alumina. There was thus obtained 0.27 gram of dehydroergosteryl acetate, which melted at 144 to 146 degrees centigrade.

(h) QUINOLINE

A solution of two grams of the maleic anhydride adduct of dehydroergosteryl acetate in twenty milliliters of quinoline was heated under reflux for four and one-half hours, and the excess amine removed by distillation under reduced pressure. The residue was dissolved in fifty milliliters of benzene and chromatographed over alumina. Upon evaporation of the solvent, there was obtained 0.68 gram of dehydroergosteryl acetate, which melted at 142 to 145 degrees centigrade.

(i) PIPERIDINE

A solution of two grams of the maleic anhydride adduct of dehydroergosteryl acetate in twenty milliliters of piperidine was heated under reflux for four and one-half hours, and the excess amine removed by distillation under reduced pressure. The residue was dissolved in fifty milliliters of benzene and chromatographed over alumina. Upon evaporation of the solvent, there was obtained 0.35 gram of dehydroergosteryl acetate, which melted at 140 to 144 degrees centigrade.

Example 2.—*Decomposition of the maleic anhydride adduct of ergosteryl acetate*

A solution of 2.0 grams of the maleic anhydride adduct of ergosteryl acetate in nineteen milliliters of dimethylaniline was heated under reflux for six hours and the excess amine removed under reduced pressure. The residue was dissolved in fifty milliliters of ether, washed with equal volumes of cold one precent sulfuric acid, cold five percent sodium carbonate solution, water, and dried. The solvent was removed and the residue crystallized from ethanol to obtain 1.5 grams of starting material. By chromatography of the mother liquors, 0.39 gram of ergosteryl acetate, melting at 168 to 174 degrees centigrade, was obtained.

Example 3.—*Decomposition of the maleic anhydride adduct of methyl 3(beta) acetoxybisnor-5,7,9(11)-cholatrienate*

(a) DIMETHYLANILINE

A solution of one gram of the maleic anhydride adduct of methyl 3(beta) - acetoxybisnor- 5,7,9(11)-cholatrienate in ten milliliters of dimethyl aniline was heated under reflux in a nitrogen atmosphere for six hours and the excess amine removed under reduced pressure. The residue was dissolved in 100 milliliters of ether, washed with equal volumes of cold one percent sulfuric acid, five percent sodium carbonate solution, water, and dried. Upon concentration of the organic solution to a volume of about fifteen milliliters, 0.61 gram of methyl 3(beta)-acetoxybisnor-5,7,9(11)-cholatrienate, which melted at 119 to 121.5 degrees centigrade, was obtained. An additional 0.2 gram of ester was obtained by chromatography of the mother liquors, thus making the conversion quantitative.

(b) N,N-DIMETHYLBENZYLAMINE

A solution of one gram of the maleic anhydride adduct of methyl 3(beta)-acetoxybisnor-5,7,9(11)-cholatrienate in ten milliliters of N,N-dimethylbenzylamine was heated under reflux for four hours, whereafter excess amine was removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.81 gram of methyl 3(beta)-acetoxybisnor-5,7,9(11)-cholatrienate, which melted at 119 to 122 degrees centigrade.

(c) QUINOLINE

A solution of one gram of the maleic anhydride adduct of methyl 3(beta)-acetoxybisnor-5,7,9(11)-cholatrienate in ten milliliters of quinoline was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.45 gram of methyl 3(beta) - acetoxybisnor - 5,7,9(11)-cholatrienate, which melted at 114 to 119 degrees centigrade.

(d) PIPERIDINE

A solution of two grams of the maleic anhydride adduct of methyl 3(beta)-acetoxybisnor-5,7,9(11)-cholatrienate in twenty milliliters of piperidine was heated under reflux for four and one-half hours, and the excess amine removed by distillation under reduced pressure. The residue was dissolved in fifty milliliters of benzene and chromatographed over alumina. Upon evaporation of the solvent, there was obtained 0.25 gram of methyl 3(beta)-acetoxybisnor-5,7,9(11)-cholatrienate, which melted at 119 to 121.5 degrees centigrade.

(e) QUINOLINE

A solution of two grams of the maleic anhydride adduct of methyl 3(beta)-acetoxybisnor-5,7,9(11)-cholatrienate in twenty milliliters of quinoline was heated under reflux for four and one-half hours, and the excess amine removed by distillation under reduced pressure. The residue was dissolved in fifty milliliters of benzene and chromatographed over alumina. Upon evaporation of the solvent, there was obtained 0.65 gram of methyl 3(beta)-acetoxybisnor-5,7,9(11)-cholatrienate, which melted at 118 to 121 degrees centigrade.

(f) ANILINE

A solution of one gram of the maleic anhydride adduct of methyl 3(beta)-acetoxybisnor-5,7,9(11)-cholatrienate in ten milliliters of aniline was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.20 gram of methyl 3-(beta)-acetoxybisnor-5,7,9(11)-cholatrienate, which melted at 118 to 122 degrees centigrade.

(g) DIETHYLAMINE

A solution of one gram of the maleic anhydride adduct of methyl 3(beta-acetoxybisnor-5,7,9(11)-cholatrienate in ten milliliters of diethylamine was heated in an autoclave at 175 degrees centigrade for four hours, cooled, and the excess amine removed by distillation under reduced pressure. The residue was dissolved in 100 milliters of ethyl ether, washed with equal volumes of cold one percent sulfuric acid, cold five percent sodium carbonate solution, water, and dried. The solvent was removed by distillation, the residue dissolved in 100 milliliters of benzene and chromatographed over alumina. There was thus obtained 0.79 gram of methyl 3(beta)-acetoxybisnor-5,7,9(11)-cholatrienate, which melted at 121 to 122 degrees centigrade.

(h) N-ETHYLPYRROLIDINE

A solution of one gram of the maleic anhydride adduct of methyl 3(beta)-acetoxybisnor-5,7,9(11)-cholatrienate in ten milliliters of N-ethylpyrrolidine was heated in an autoclave at 175 degrees centigrade for four hours, cooled, and the excess amine demoved by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.65 gram of methyl 3(beta)-acetoxybisnor-5,7,9(11)-cholatrienate, which melted at 121 to 122 degrees centigrade.

In a like manner there can be prepared from the corresponding maleic anhydride adduct of a 3-acyloxybisnor-5,7,9(11)-cholatrienic acid ester, methyl 3-heptanoyloxybisnor-5,7,9(11)-cholatrienate, ethyl 3-benzoyloxybisnor-5,7,9(11)-cholatrienate, isopropyl 3-propionoxybisnor-5,7,9(11)-cholatrienate and the like.

*Example 4.—Decomposition of the maleic acid adduct of dehydroergosteryl heptanoate*

(a) DIMETHYLANILINE

A solution of 0.50 gram of the maleic anhydride adduct of dehydroergosteryl heptanoate in nine milliliters of dimethyl aniline was heated under reflux for four and one-half hours and the excess amine removed by distillation under reduced pressure. The residue was dissolved in fifty milliliters of ether, washed with equal volumes of cold one percent sulfuric acid, five percent sodium carbonate solution, water, and dried. The solvent was removed by distillation and the residue crystallized from methanol. There was thus obtained 0.24 gram of dehydroergosteryl heptanoate, which melted at 121 to 129 degrees centigrade.

(b) N,N-DIMETHYLBENZYLAMINE

A solution of two grams of the maleic anhydride adduct of dehydroergosteryl heptanoate in twenty milliliters of N,N-dimethylbenzylamine was heated under reflux for four and one-half hours, and the excess amine removed by distillation under reduced pressure. The residue was dissolved in fifty milliliters of benzene and chromatographed over alumina. Upon evaporation of the solvent, there was obtained 1.5 grams of dehydroergosteryl heptanoate, which melted at 128 to 130 degrees centigrade.

*Example 5.—Decomposition of the maleic anhydride adduct of 3(beta)-acetoxy-5,7,9(11)-pregnatrien-20-one*

(a) DIMETHYLANILINE

A solution of two grams of the maleic anhydride adduct of 3(beta)-acetoxy-5,7,9(11)-pregnatrien-20-one in eighteen milliliters of dimethylaniline was heated under reflux for four and one-half hours and the excess amine removed by distillation under reduced pressure. The residue was dissolved in fifty milliliters of benzene and chromatographed over alumina. Upon evaporation of the solvent, there was obtained 1.5 grams of 3(beta)-acetoxy-5,7,9(11)-pregnatrien-20-one, which melted at 130 to 134 degrees centigrade. Recrystallization for analysis gave material melting at 141–143 degrees centigrade. Ultraviolet absorption spectrum: Maxima at 312.5 m$\mu$ (E=9500), 325 m$\mu$ (E=10800), 339 m$\mu$ (E=6700) in 95 percent alcohol.

(b) N,N-DIMETHYLBENZYLAMINE

A solution of two grams of the maleic anhydride adduct of 3(beta)-acetoxy-5,7,9(11)-pregnatrien-20-one in twenty milliliters of N,N-dimethylbenzylamine was heated under reflux for four and one-half hours, and the excess amine removed by distillation under reduced pressure. The residue was dissolved in fifty milliliters of benzene and chromatographed over alumina. Upon evaporation of the solvent, there was obtained 1.56 grams of 3(beta)-acetoxy-5,7,9(11)-pregnatrien-20-one, which melted at 130 to 134 degrees centigrade.

(c) DIETHYLAMINE

A solution of one gram of the maleic anhydride adduct of 3(beta)-acetoxy-5,7,9(11)-pregnatrien-20-one in ten milliliters of diethylamine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.71 gram of 3(beta)-acetoxy-5,7,9(11)-pregnatrien-20-one, which melted at 131 to 133 degrees centigrade.

(d) MORPHOLINE

A solution of one gram of the maleic anhydride adduct of 3(beta)-acetoxy-5,7,9(11)-pregnatrien-20-one in ten milliliters of morpholine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.091 gram of 3(beta)-acetoxy-5,7,9(11)-pregnatrien-20-one, which melted at 130 to 134 degrees centigrade.

(e) DIMETHYLAMINOETHANOL

A solution of one gram of the maleic anhydride adduct of 3(beta)-acetoxy-5,7,9(11)-pregnatrien-20-one in ten milliliters of beta-dimethylaminoethanol was heated under reflux for six hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.35 gram of 3(beta) - acetoxy - 5,7,9(11)-pregnatrien-20-one which melted at 129 to 133 degrees centigrade.

In a manner similar to the above methods there can be obtained from the corresponding 3-acyl-maleic anhydride adduct, 3-butyryloxy-5,7,9(11) - pregnatrien - 20-one, 3-heptanoyloxy-5,7,9(11) - pregnatrien - 20 - one, 3-benzoyloxy-5,7,9(11) - pregnatrien - 20 - one, 3-propionyloxy-5,7,9(11)-pregnatrien-20-one, and the like.

Example 6.—Decomposition of the maleic anhydride adduct of 3(beta),22-diacetoxy-5,7,9(11),-20(22)-bisnorcholatetraene (a) DIMETHYLANILINE A solution of one gram of the maleic anhydride adduct of 3(beta),22-diacetoxy-5,7,9(11),20(22)-bisnorcholatetraene in ten milliliters of dimethyl aniline was heated under reflux for five hours, and the excess amine removed under reduced pressure. Upon crystallization of the residue there was thus obtained 0.65 gram (80 percent of theory) of 3(beta),22 - diacetoxy - 5,7,9(11), 20(22)-bisnorcholatetraene, which melted at 108 to 121 degrees centigrade.

(b) N,N-DIMETHYLBENZYLAMINE

A solution of one gram of the maleic anhydride adduct of 3(beta)-22-diacetoxy-5,7,9(11),20(22)-bisnorcholatetraene in ten milliliters of N,N-dimethylbenzylamine was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.73 gram of 3(beta),22-diacetoxy - 5,7,9(11),20(22) - bisnorcholatetraene, which melted at 112 to 122 degrees centigrade.

(c) N-ETHYLPYRROLIDINE

A solution of one gram of the maleic anhydride adduct of 3(beta),22-diacetoxy-5,7,9(11),20(22)-bisnorcholatetraene in ten milliliters of N-ethylpyrrolidine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.69 gram of 3(beta),22-diacetoxy-5,7,9(11),20(22) - bisnorcholatetraene, which melted at 108 to 121 degrees centigrade.

(d) MORPHOLINE

A solution of one gram of the maleic anhydride adduct of 3(beta),22-diacetoxy-5,7,9(11),20(22)-bisnorcholatetraene in ten milliliters of morpholine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.15 gram of 3(beta),22-diacetoxy-5,7,9(11),20(22) - bisnorcholatetraene, which melted at 110 to 122 degrees centigrade.

In a manner similar to the above there can be obtained from the corresponding 3,22-diacyloxy-5,7,9(11),20(22) - bisnor - cholatetraene maleic anhydride adducts, 3-heptanoyloxy-22-acetoxy-5,7,9(11),20(22)-bisnor-cholatetraene, 3 - benzoyloxy - 22 - propionoxy - 5,7,9(11),20(22)-bisnor-cholatetraene, 3 - butyroxy-22-benzoyloxy-5,7,9(11),20(22) - bisnorcholatetraene, and the like.

The above 3,22-diacyloxy-5,7,9(11),20(22)-bisnorcholatetraenes may be converted, by heating their aqueous-alcoholic dilute hydrochloric acid solutions for a short period of time, to the corresponding 3-acyloxy-5,7,9(11)-bisnorcholatrien-22-aldehydes such as 3-acetoxy-5,7,9(11)-bisnorcholatrien-22-al, 3 - heptanoyloxy - 5,7,9(11)-bisnorcholatrien-22-al, 3-benzoyloxy-5,7,9(11)-bisnorcholatrien-22-al, and the like.

Example 7.—Decomposition of the maleic acid adduct of dehydroergosterol

A solution of 0.5 gram of the maleic acid adduct of dehydroergosterol in eight milliliters of dimethylaniline was heated under reflux in an atmosphere of nitrogen for four and one-half hours, and the excess amine removed by distillation under reduced pressure. The residue was dissolved in 100 milliliters of ether, washed with equal volumes of cold one percent sulfuric acid, cold five percent sodium carbonate solution, water, and dried. Upon concentration of the organic solution to about twenty milliliters and dilution with twenty milliliters of methanol, there was obtained 0.22 gram of dehydroergosterol, which melted at 115 to 128 degrees centigrade. Upon recrystallization from methanol, pure dehydroergosterol, which melted at 144 to 146 degrees centigrade, was obtained.

Example 8.—Decomposition of the maleic anhydride adduct of 3,21-diacetoxy-5,7,9(11)-pregnatrien-20-one (a) DIMETHYLANILINE A solution of 0.76 gram of the maleic anhydride adduct of 3,21-diacetoxy-5,7,9(11)-pregnatrien-20-one in eight milliliters of dimethylaniline was heated under reflux for four and one-half hours under an atmosphere of nitrogen and the excess amine removed by distillation under reduced pressure. The residue was dissolved in 100 milliliters of ethyl ether, washed with equal volumes of cold one percent sulfuric acid, cold five percent sodium carbonate solution, water, dried, and the solvent removed by distillation. Upon crystallization of the residue from fifteen milliliters of methanol, there was obtained 0.26 gram of 3,21-diacetoxy-5,7,9(11)-pregnatrien-20-one, which melted at 134 to 138 degrees centigrade. When the product was recrystallized twice from methanol, its melting point was raised to 143.5 to 145.5 degrees centigrade.

(b) N,N-DIMETHYLBENZYLAMINE

A solution of one gram of the maleic anhydride adduct of 3,21-diacetoxy-5,7,9(11)-pregnatrien-20-one in ten milliliters of N,N-dimethylbenzylamine was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.45 gram of 3,21-diacetoxy-5,7,9(11)-pregnatrien-20-one, which melted at 136 to 140 degrees centigrade.

In a like manner there can be obtained from the corresponding 3 - acyloxy - 21 - acetoxy-5,7,9(11)-pregnatrien-20-one maleic anhydride adduct, 3-butyroxy-21-acetoxy-5,7,9(11)-pregnatrien - 20 - one, 3 - heptanoyloxy - 21 - acetoxy-5,7,9(11)-pregnotrien - 20 - one, 3-benzoyloxy-21-acetoxy-5,7,9(11)-pregnatrien-20-one, and the like.

Example 9—Decomposition of the maleic acid adduct of 5,7,9(11)-pregnatrien-3,20-dione

(a) DIMETHYLANILINE

A solution of 0.49 gram of the maleic acid adduct of 5,7,9(11)-pregnatrien-3,20-dione in eight milliliters of dimethylaniline was heated under reflux for four and one-half hours in an atmosphere of nitrogen, and the excess amine removed by distillation under reduced pressure. The residue was dissolved in fifty milliliters of ethyl ether, washed with equal volumes of cold one percent sulfuric acid, cold five percent sodium carbonate solution, water, dried, and the solvent removed by distillation. The residue was dissolved in 100 milliliters of benzene and chromatographed over an alumina column. There was thus obtained 0.229 gram of 4,7,9(11)-pregnatrien-3,20-dione which, upon crystallization from ethyl ether-isopropyl ether, melted at 180 to 186 degrees centigrade.

(b) N,N-DIMETHYLBENZYLAMINE

A solution of two grams of the maleic acid adduct of 5,7,9(11)-pregnatrien-3,20-dione in twenty milliliters of N,N-dimethylbenzylamine was heated under reflux for four and one-half hours, and the excess amine removed by distillation under reduced pressure. The residue was dissolved in fifty milliliters of benzene and chromatographed over alumina. Upon evaporation of the solvent there was obtained 1.41 grams of 4,7,9(11)-pregnatrien-3,20-dione which melted at 175 to 185 degrees centigrade.

(c) DIETHYLAMINE

A solution of one gram of the maleic acid adduce of 5,7,9(11)-pregnatrien-3,20-dione in ten milliliters of diethylamine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.50 gram of 4,7,9(11)-pregnatrien-3,20-dione, which melted at 176 to 186 degrees centigrade.

(d) N-ETHYLPYRROLIDINE

A solution of one gram of the maleic acid adduct of 5,7,9(11)-pregnatrien-3,20-dione in ten milliliters of N-ethylpyrrolidine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.25 gram of 4,7,9(11)-pregnatrien-3,20-dione, which melted at 175 to 185 degrees centigrade.

Example 10.—Decomposition of the maleic anhydride adduct of 3(beta),20-diacetoxy-5,7,9(11,-17(20)-pregnatetraene

(a) DIMETHYLANILINE

A solution of one gram of the maleic anhydride adduct of 3(beta),20-diacetoxy-5,7,9(11),17(20)-pregnatetraene in ten milliliters of dimethylaniline was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.45 gram of 3(beta),20-diacetoxy-5,7,9(11),17(20)-pregnatetraene, which melted at 195 degrees centigrade.

(b) N,N-DIMETHYLBENZYLAMINE

A solution of 0.1 gram of the maleic anhydride adduct of 3(beta),20-diacetoxy-5,7,9(11),17(20)-pregnatetraene in ten milliliters of N,N-dimethylbenzylamine was heated under reflux for three hours, and the excess amine removed by distillation under reduced pressure. The residue was dissolved in fifty milliliters of benzene and chromatographed over alumina. Upon evaporation of the solvent, there was obtained 0.048 gram of 3(beta),20 - diacetoxy - 5,7,9(11),17(20)-pregnatetraene, which melted at 195 degrees centigrade.

In a like manner there can be prepared from the corresponding 3,20-diacyloxy-5,7,9(11),17-(20)-pregnatetraene maleic anhydride adduct, 3 - heptanoyloxy - 20 - acetoxy - 5,7,9(11),17-(20) - pregnatetraene, 3 - benzoyloxy - 20 - acetoxy - 5,7,9(11),17(20) - pregnatetraene, 3 - acetoxy - 20 - propionoxy - 5,7,9(11),17(20)pregnatetraene, 3 - butyroxy - 20 - benzoyloxy - 5,7,9-(11),17(20)-pregnatetraene, and the like.

Various modifications may be made in the process and products of the present invention without departing from the spirit and scope thereof, and it is to be understood that we limit ourselves only as defined in the appended claims.

We claim:
1. An alkyl 3-acyloxy-bisnor-5,7,9(11)-cholatrienate, wherein the acyloxy group is the residue of an unsubstituted organic monocarboxylic acid having from one to ten carbon atoms, inclusive.

2. Methyl 3 - acetoxy - bisnor - 5,7,9(11) - cholatrienate.

3. A 3 - acyloxy - 5,7,9(11) - bisnor - cholatrien-22-al, wherein the acyloxy group is the residue of an unsubstituted organic monocarboxylic acid having from one to ten carbon atoms, inclusive.

4. 3 - acetoxy - 5,7,9(11) - bisnor - cholatrien-22-al.

5. A method for the elimination of the adduct radical from a member of the group consisting of 5,8-cyclopentanopolyhydrophenanthrene maleic acid adducts and 5,8-cyclopentanopolyhydrophenanthrene maleic anhydride adducts comprising heating said adduct in the presence of an organic amine thereby to effect thermal decomposition of the adduct into its components at a temperature substantially lower than that temperature required to effect such decomposition by heat alone.

6. The method of claim 5 wherein the reaction temperature is between about 100 and about 225 degrees centigrade.

7. The method of claim 5 wherein the amine is a member of the group consisting of (a) secondary and tertiary aliphatic and cycloaliphatic amines containing up to and including 18 carbon atoms, (b) secondary and tertiary amino alcohols, (c) primary, secondary and tertiary aromatic amines having one aromatic nucleus joined to the nitrogen atom, (d) secondary and tertiary aralkylamines and (e) heterocyclic amines containing up to and including ten carbon atoms.

8. The method of claim 5 wherein the reaction temperature is between about 150 and about 200 degrees centigrade.

9. A method for the elimination of the adduct radical from a member of the group consisting of 5,8-cyclopentanopolyhydrophenanthrene maleic acid adducts and 5,8-cyclopentanopolyhydrophenanthrene maleic anhydride adducts which includes: heating said adduct in the presence of an amine from the group consisting of (a) secondary and tertiary aliphatic and cycloaliphatic amines containing up to and including 18 carbon atoms; (b) secondary and tertiary amino alcohols; (c) primary, secondary, and tertiary aromatic amines having one aromatic nucleus joined to the nitrogen atom; (d) secondary and tertiary aralkylamines; and, (e) heterocyclic amines containing up to and including ten carbon atoms, thereby to effect thermal decomposition of the adduct into its components at a temperature substantially lower than that temperature required to effect such decomposition by heat alone.

10. The method of claim 9 wherein the amine is an aralkyl tertiary amine containing a single aralkyl group.

11. The method of claim 9 wherein the amine is an alkylpyrrolidine.

12. The method of claim 9 wherein the amine is dimethyl aniline.

13. The method of claim 9 wherein the amine is dimethylbenzylamine.

14. The method of claim 9 wherein the amine is N-ethyl pyrrolidine.

15. A method for the elimination of the adduct radical from a member of the group consisting of 5,8-cyclopentanopolyhydrophenanthrene maleic acid adducts and 5,8-cyclopentanopolyhydrophenanthrene maleic anhydride adducts which includes: heating said adduct at a temperature between about 100 and about 225 degrees centigrade in the presence of an amine from the group consisting of (a) secondary and tertiary aliphatic and cycloaliphatic amines containing up to and including 18 carbon atoms; (b) secondary and tertiary amino alcohols; (c) primary, secondary, and tertiary aromatic amines having one aromatic nucleus joined to the nitrogen atom; (d) secondary and tertiary aralkylamines; and, (e) heterocyclic amines containing up to and including ten carbon atoms, thereby to effect thermal decomposition of the adduct into its components at a temperature substantially lower than that temperature required to effect such decomposition by heat alone.

ROBERT H. LEVIN.
A. VERN McINTOSH, Jr.
GEORGE B. SPERO.

No references cited.